United States Patent [19]
Van de Wynckel et al.

[11] Patent Number: 5,639,362
[45] Date of Patent: Jun. 17, 1997

[54] APPARATUS AND METHOD FOR DE-SILVERING A SILVER-CONTAINING SOLUTION

[75] Inventors: Werner Van de Wynckel, Mortsel; Benedictus Jansen, Geel, both of Belgium

[73] Assignee: AGFA-Gevaert N. V., Mortsel, Belgium

[21] Appl. No.: 686,320

[22] Filed: Jul. 25, 1996

Related U.S. Application Data

[60] Provisional application No. 60/004,476 Sep. 28, 1995.

[30] Foreign Application Priority Data

Aug. 4, 1995 [EP] European Pat. Off. ............ 95202133

[51] Int. Cl.$^6$ .................................................. C02F 1/461
[52] U.S. Cl. .................. 205/571; 205/743; 205/771; 204/228; 204/231; 204/233; 204/267; 204/272
[58] Field of Search ..................... 205/743, 771, 205/571; 204/231, 267, 272, 228, 233

[56] References Cited

U.S. PATENT DOCUMENTS

| 4,427,505 | 1/1984 | Stevens | 205/571 |
| 5,454,924 | 10/1995 | Jansen et al. | 204/231 |

FOREIGN PATENT DOCUMENTS

| 2275570 | 1/1976 | France . |
| 1809728 | 8/1969 | Germany . |
| 2198560 | 6/1988 | United Kingdom . |

*Primary Examiner*—Arun S. Phasge
*Attorney, Agent, or Firm*—Brumbaugh, Graves, Donohue & Raymond

[57] ABSTRACT

An apparatus for de-silvering a silver-containing solution, comprises a plurality of electrolysis cells (10, S1, S2) each having an anode (20, 120, 220) and a cathode (30, 130, 230). A master cell (10) further comprises a reference electrode (45). The remaining cell or cells constitute slave cells (S1, S2). Control means (41) adjust the cathode potential applied to the slave cells (S1, S2) in response to the current flow ($I_M$) through the master cell (10). The apparatus is particularly suitable for de-silvering large volumes of silver-containing solution, without the use of high currents.

13 Claims, 3 Drawing Sheets

APPARATUS AND METHOD FOR DE-SILVERING A SILVER-CONTAINING SOLUTION

This application claims te benefit of U.S. Provisional Application No. 60/004,476 filed Sep. 28, 1995.

DESCRIPTION

1. Field of the Invention

The present invention relates to an apparatus and method for de-silvering a silver-containing solution, in particular used photographic solutions such as fixing and bleach-fixing solutions.

2. Background of the Invention

Electrolytic silver recovery from used photographic solutions is a common way to extend the life of such solutions.

An apparatus for the electrolytic recovery of silver from solutions containing silver is known from European patent application EPA 93200427.8 (Agfa-Gevaert NV) filed 16 Feb. 1993. The apparatus comprises an electrolytic cell having an anode and a cathode, and electrical power supply control means for controlling the supply of electrical power to the anode and the cathode.

The control of the electrochemical process taking place at the anode and the cathode is important in the silver recovery process. If too high a potential difference is applied, side reactions can occur, depending upon the nature of the silver-containing solution, leading to unwanted by-products.

There are a number of known methods of controlling the de-silvering process. In potentiostatic control, a reference electrode is included in the electrolytic cell and the potential difference between the cathode and the reference electrode is kept constant. This allows complete control over the cathode potential. This method of operation is therefore widely preferred, since it is the cathode potential which determines the electrochemical reactions which take place in the solution. By using a reference electrode, the influence of the anode potential (and largely also the ohmic potential contributions) are excluded. This enables the cathode potential to be set at a level where bad silver adhesion, side reactions and sulphiding of the cathode can be avoided, independently of the anode potential. The use of a reference electrode makes the equipment more reliable, since factors such as the current density at the anode, the surface state of the anode, over-potential at the anode (caused by changes in solution composition), and ohmic potential drops no longer influence the cathode potential. As the de-silvering process continues and silver is removed from the solution, the current through the cell falls while the potential difference between the cathode and the reference electrode is maintained at a fixed level. When fresh solution with a higher silver content is subsequently added, the current through the cell will normally increase and silver continues to be deposited on the cathode.

The advantage of potentiostatic control has long been recognised (see for example French patent FR 1357177 (Bayer) and it is also used in commercial equipment (e.g. ECOSYS F08, EGOMIX and ECORAP 72/51 ex Agfa-Gevaert NV).

The maximum amount of silver which can be extracted in a given cell is a function of the current density through the cell and the surface area of the cathode. For example, at a typical current density of 60 A/m$^2$, with a cathode surface area of 0.05 m$^2$, a maximum of about 12 g silver can be extracted per hour. Where it is desired to de-silver large volumes of silver containing solution, i.e. to extract greater amounts of silver per hour, the use of a large liquid capacity cell may be the first thought. However, for a given current density at the cathode, increasing the surface area of the cathode means that the total current flowing through the cell is also increased. There is a desire for reasons of modularity, to standardise the current flow through the cell. A possible solution to this problem is to pass the silver-containing solution through a plurality of these standard cells. However, in particular because reference electrodes are expensive pieces of equipment, the use of potentiostatic control in a plurality of cells is a costly option.

SUMMARY OF THE INVENTION

It is an object of the present invention to provide an apparatus and method for de-silvering large volumes of silver-containing solution, while avoiding the aforementioned disadvantages.

We have now discovered that potentiostatic control of a plurality of cells is reliably possible without the need to provide a reference electrode in each and every cell.

According to a first aspect of the invention, there is provided an apparatus for de-silvering a silver-containing solution, comprising a plurality of electrolysis cells each having an anode and a cathode, characterised in that one of said cells is a master cell further comprising a reference electrode and is associated with means for detecting the current flow through the master cell, the remaining cell or cells constituting slave cells which are associated with control means for adjusting the slave cathode potentials therein in response to the current flow through the master cell.

The silver-containing solution may be selected from photographic fixing and bleach-fixing solutions. The silver concentration in the silver-containing solution is typically from 0.05 g/l to 5 g/l.

Preferably, the control means is adapted to ensure that the current flow ($I_S$) through the or each slave cell is substantially identical to the current flow ($I_M$) through the master cell, or at least within 95% to 105% thereof. A suitable control means for achieving this comprises a current copier.

The master cell will usually be associated with means for controlling the current flow there-through, in accordance with a desired control regime, such as potentiostatic control. This may be achieved by the provision of a potentiometer for controlling the potential applied to the cathode of the master cell, this potentiometer being adjustable in response to a measurement of potential difference between the cathode and the reference electrode of the master cell.

An advantage of the present invention is that it is unnecessary for the or each slave cell to include a reference electrode, the delivering in the or each slave cell being carried out with a current flow closely similar to that passing through the master cell.

Preferably, the master cell is hydraulically arranged in series with the or each slave cell. A hydraulically parallel arrangement is also possible, although the series arrangement has the added advantage of a higher liquid flow rate through each cell leading to better agitation.

Preferably, the liquid capacity of the or each slave cell is substantially identical to the liquid capacity of the master cell, or at least within 95% to 105% thereof.

The invention also provides, according to a second aspect, a method of de-silvering a silver-containing solution, comprising passing the solution to a plurality of electrolysis cells each cell having an anode and a cathode, characterised in that one of the cells is a master cell further comprising a reference electrode, while the remaining cell or cells constitute slave cells, the method including the steps of detecting the current flow through the master cell and adjusting the cathode potential in the or each slave cell in response thereto.

The de-silvering process can be carried out batch-wise or continuously, the apparatus being connected to the fixing solution forming part of a continuous processing sequence. The apparatus according to the invention may be designed to be operated manually, automatically or automatically with manual over-ride.

The material used for the anode of each cell is not especially critical, although platinated titanium is usually used. Platinum, graphite and nobel metals are alternatives. The anode may be in the form of a rod or tube, located at the axis of the electrolytic cell, where this is in cylindrical form.

The cathode may be formed from a generally flat sheet of flexible material, an electrically conductive surface being provided on one major face thereof, securing means being provided to enable the sheet to be folded into and secured in an open circular cross-sectional configuration. The cathode preferably ideally has a frusto-conical cross-section, with its larger radius end uppermost, that is towards the circular upper opening of the electrolyte cell.

This configuration enables easy removal of the cathode even after a silver deposit has built up there-on after use. Usable cathode materials include stainless steel, silver and silver alloys, and other conductive materials, the non-silver containing materials being preferred from the point of view of costs, while the silver containing materials cause fewer starting-up problems.

The positioning of the reference electrode in the master cell is important to the de-silvering process. While in principle the electrode would be best placed between the cathode and the anode, as close as possible to the cathode, this may cause troubles as more and more silver is deposited on the cathode, which is thus growing thicker. When the reference electrode is placed further from the cathode, say 20 mm therefrom, ohmic potential drops will cause the potentiostatic de-silvering not to be truly potentiostatic. It has therefore been proposed to place the reference electrode on the far side of the cathode from the anode, but close to the cathode. We prefer to place the reference electrode at a distance of 5 mm behind the cathode, and the potential difference values quoted herein are based on such a distance. If the reference electrode is placed nearer to or further from the cathode, an appropriate correction needs to be applied. In any event, the reference electrode should preferably be positioned from 1 mm and 50 mm from the cathode.

In one embodiment of the master cell, the cathode includes an opening extending from the outer face to the inner face, the opening being located in the neighbourhood of the reference electrode to ensure that the reference electrode is located within the electrical field of the cell.

The reference electrode may conveniently be positioned adjacent the outlet port of the master cell. Reference electrodes suitable for use in electrolytic de-silvering include calomel type electrodes or Ag/AgCl type electrodes, but we particularly prefer the use of a pH sensitive electrode such as a glass electrode, a hydrogen electrode, a quinhydrone electrode and an antimony electrode, most especially a glass electrode which is relatively maintenance free and which is moreover insensitive to hydrostatic pressure variations.

The potential at which the reduction of sulphite starts to take place is dependant on the pH of the fixing solution. Therefore, the potential to be used for optimum de-silvering is dependant upon the nature of the fixer used and other parameters such as the pH of the developer bath, the presence or absence of intermediate rinsing, the degree of carry over from the developer to the fixer, and the buffering capacities of the developer and the fixer solutions. We prefer that the reference electrode is a pH sensitive electrode. A suitable electrode has been disclosed in European patent application EP 598144 (Agfa-Gevaert NV).

In a preferred embodiment of the invention, the master cell comprises a housing, an anode, a removable cathode and a reference electrode all positioned within the housing. The cathode has an inner face directed towards the anode and an outer face directed towards the reference electrode. The slave cells will be similar, but without the provision of a reference electrode. In use, silver from the silver containing solution is deposited on that face of each cathode which is directed towards the anode.

In a suitable embodiment of the invention, each cell housing is formed of electrically non-conductive material and may be generally cylindrical, although other shapes are possible. A cylindrical shape to the cell enables the cathode to be positioned near to the wall of the housing. The anode has a generally linear configuration axially located within the housing. The cathode has an open circular cross-sectional configuration surrounding the anode. In the master cell, the reference electrode is located in a side arm of the housing. Preferably, the housing further comprises a liquid inlet and a liquid outlet for the electrolyte liquid, predetermining a liquid level within the cell. In an embodiment of the cell, the housing is provided with an electrically conductive contact surface above the liquid level and clamping means serve to clamp a contact portion of the cathode against the contact surface of the housing to complete an electrical connection to the cathode. The contact portion of the cathode should have an electrically conductive surface. The provision of the contact surface in an upper part of the electrolytic cell housing, in particular an annular contact surface, enables this surface to be above the level of the electrolyte in the cell in use, thus reducing the risk of leakage and corrosion.

In a series arrangement, the silver-containing solution may be supplied to the apparatus at rate of from 2 to 25 l/minute/cell.

PREFERRED EMBODIMENTS OF THE INVENTION

The invention will now be further described, purely by way of example, by reference to the accompanying drawings in which.

Figure 1:
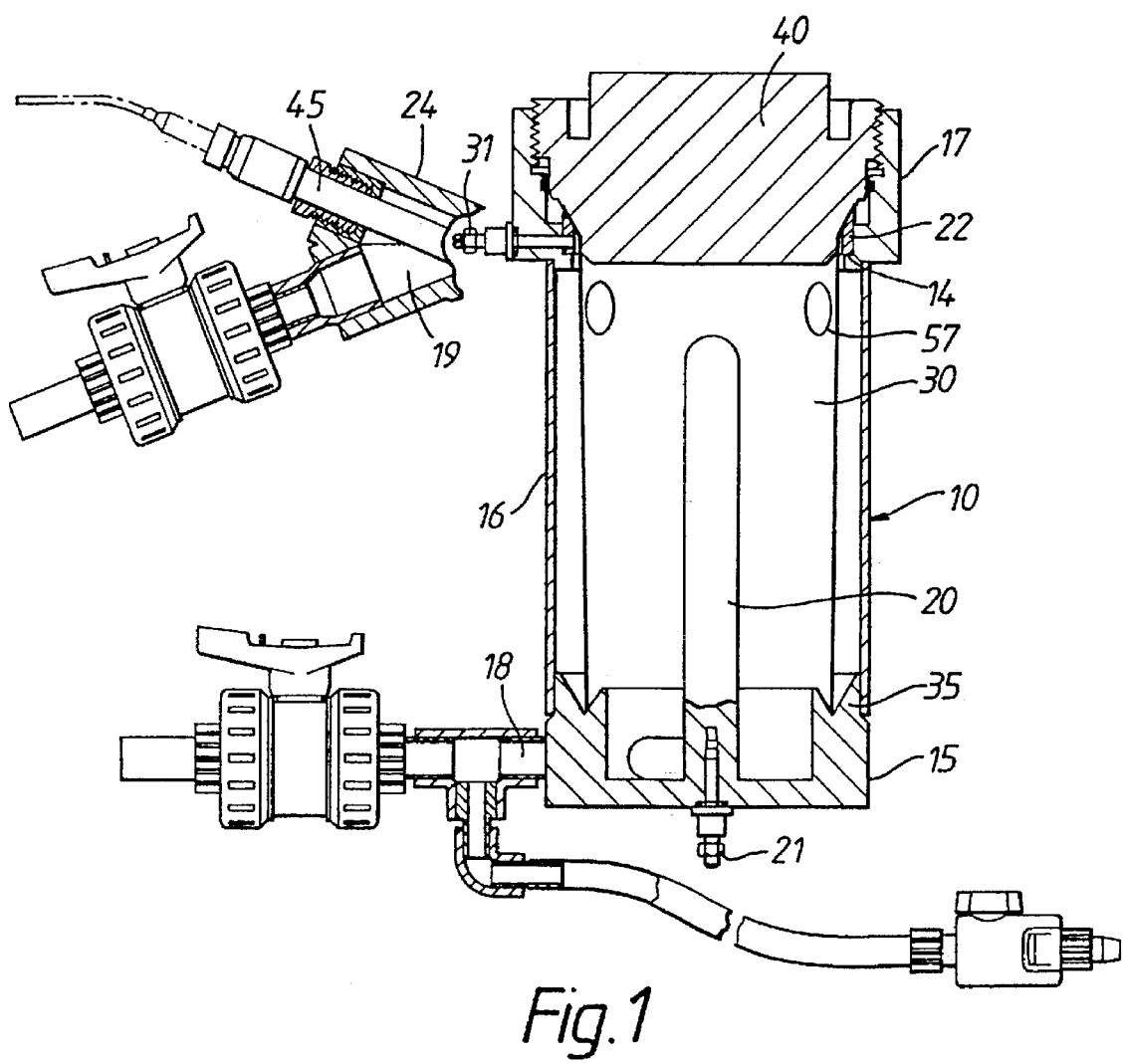
FIG. 1 shows, partly in cross-section, an electrolytic cell for use in accordance with the invention.

FIG. 1 shows an electrolytic cell 10, suitable for use as a master cell in the apparatus of the invention. The master cell 10 is formed of electrically non-conductive material such as PVC, and comprising a base 15, sides 16 and an upper portion 17. An electrolyte inlet port 18 is provided towards the bottom of the cell and an electrolyte outlet port 19 is provided towards the top of the cell.

An anode 20, in the form of a platinised titanium rod, is secured to the base of the cell by means of a bolt 21 which acts as an electrical connector for the anode. The anode 20 lies along the axis of the cell 10. A reference electrode 45 is positioned in a side arm 24 of the cell 10 and protrudes into the outlet port 19 of the cell. A suitable reference electrode is a pH sensitive glass electrode such as a YOKOGAWA SM21/AG2 glass electrode.

The upper part 17 of the cell is in the form of a neck portion having an opening defined by a stainless steel ring 22. The contact surface of the ring 22 is frusto-conically shaped, having its narrower radius downwards. The stainless steel ring 22 is permanently fixed to one end of a bolt 31 which extends through the wall of the cell and provides a connector for the cathode 30. Positioned in the neck of the cell, above the level of the annular ring 22, is a sealing ring 14.

The master cell further comprises a lid 40 so shaped as to fit into the neck portion of the cell. The lid 40 is formed of electrically non-conductive material such as PVC. The lower portion of the lid 40 is shaped to correspond to the shape of the ring 22.

The cathode 30, formed for example of a flat stainless steel sheet 50 having a thickness of 100 µm, is wrapped around into a frusto-conical configuration, where the upper radius is marginally larger than the lower radius by a factor of 1.05. The cathode 30 has a deformable upper edge portion. The sheet material of which the cathode 30 is formed is sufficiently resilient to allow upper edge portion to bend outwardly in response to outwardly directed force. The deformable upper edge portion of the cathode 30 lies adjacent the stainless steel ring 22. Tightening of the lid causes the upper edge portion of the cathode 30 to be clamped firmly by the lid against the ring 22, thereby establishing good electrical contact there-between.

The cathode 30 is provided with a number of openings 57 which extend therethrough. The cathode 30 is located in the cell 10 with its bottom edge supported by a cathode support ledge 35 in the cell. One of the openings 57 is located in the neighbourhood of the reference electrode 45.

In the closed position of the lid, the sealing ring 14 bears against the outer surface of the lid 40, thereby forming a tight seal. Electrolyte liquid is now fed into the cell by way of the inlet port 18, fills the cell and exits by way of the outlet port 19. The effect of the sealing ring 14 is to prevent the electrolyte level rising above the level of the outlet port 19, so maintaining an air space above the liquid and preventing contact between the liquid and the surface of the ring 22. The risk of corrosion of the latter is thereby reduced and the opening of the cell is made easier because the air space fulfils a compression-decompression function.

Figure 2:
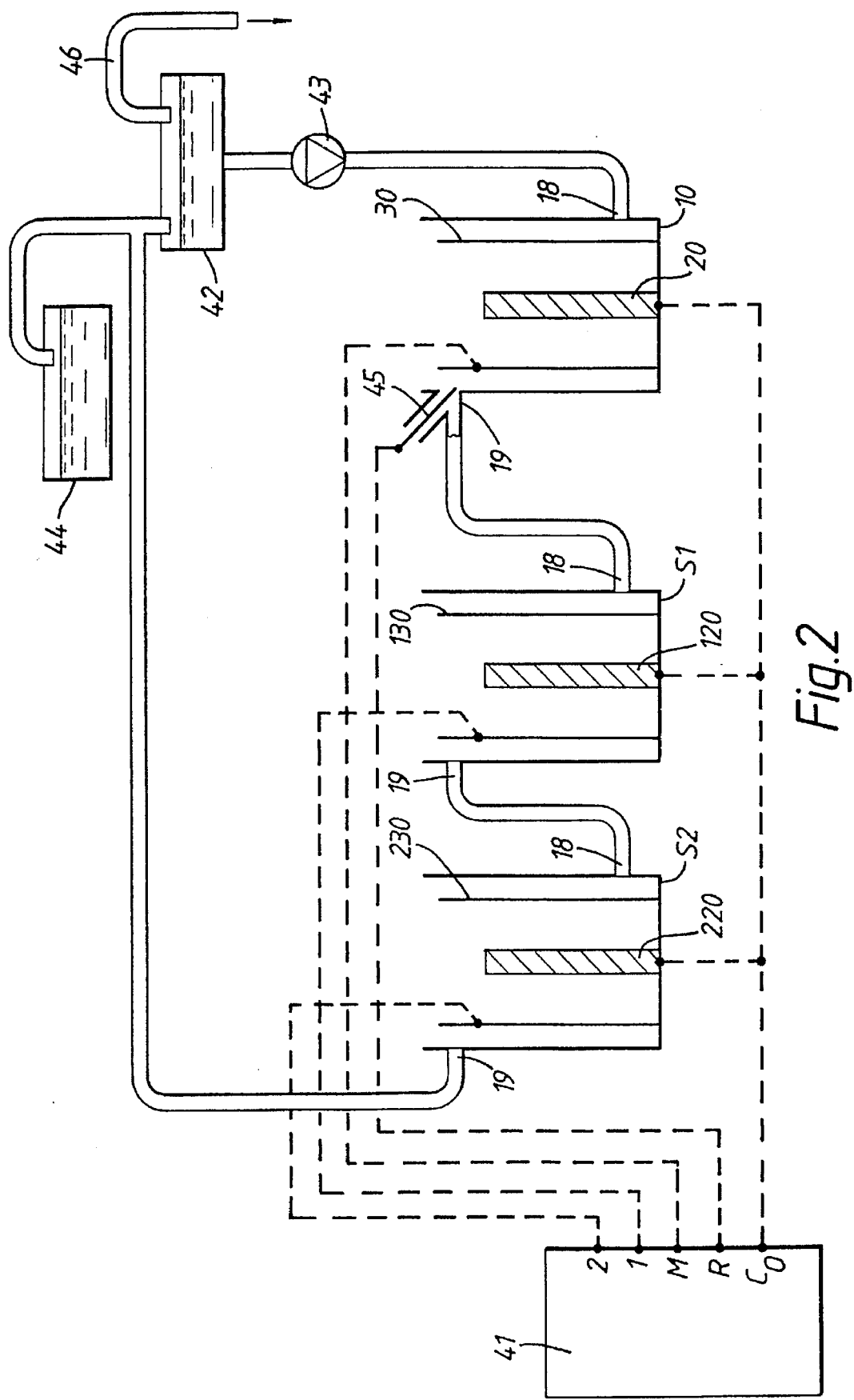
FIG. 2 is a schematic representation of the use of an apparatus according to the present invention.

The apparatus shown in FIG. 2 comprises three electrolysis cells 10, S1, S2 each having an anode 20, 120, 220 and a cathode 30, 130, 230. For the sake of clarity, the lids of the cells 10, S1 and S2 are not shown in FIG. 2. The cell 10 is a master cell as shown in FIG. 1 and the remaining cells S1, S2 are of similar construction, except for the absence of a reference electrode and constitute slave cells. All of the cells are arranged in series, with the master cell 10 being the upstream-most cell. Thus, the outlet port 19 of one cell in connected to the inlet port 18 of the next. The liquid capacity of the slave cells S1, S2 is substantially identical to that of the master cell 10.

The anodes 20, 120, 220, the cathodes 30, 130, 230 of all three cells and the reference electrode 45 of the master cell 10 are connected to a control device 41 which controls the application of electrical power to the cells.

The cell 10 is fed with contaminated fixer from a first fixer container 42 via a pump 43.

Figure 3:
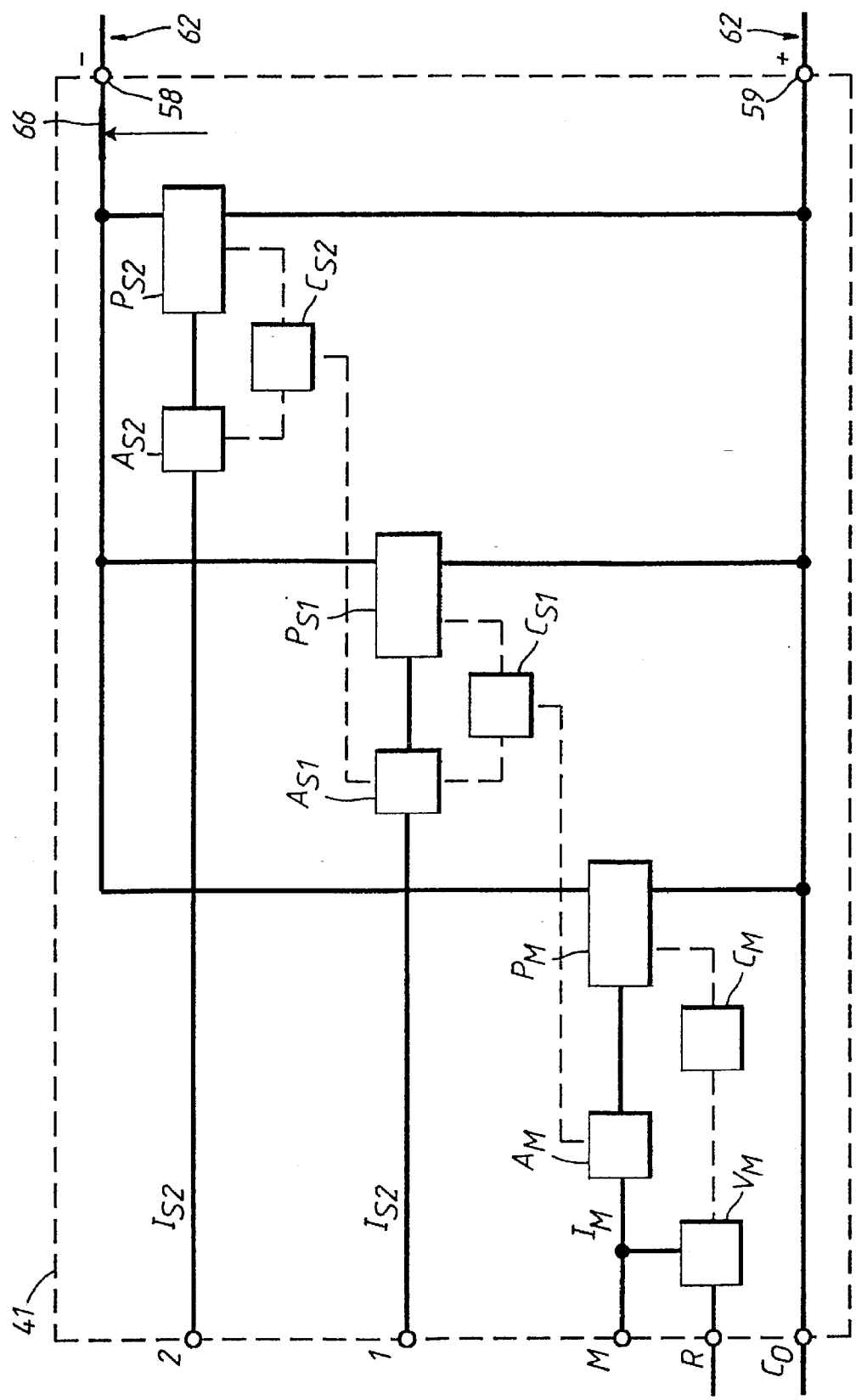
FIG. 3 is a schematic representation of a control circuit for use in the present invention.

FIG. 3 shows in more detail the control device 41 for controlling the de-silvering process. The control device 41 includes input terminals 58 and 59 between which a power source 62 is connected. The control device 41 also has a number of output terminals. Output terminal $C_0$ is connected in common to the anodes 20, 120 and 220 of all the cells 10, S1, S2. Output terminal R is connected to the reference electrode 45. Output terminal M is connected to the cathode 30 of the master cell 10. Output terminal 1 is connected to the cathode 130 of the first slave cell S1. Output terminal 2 is connected to the cathode 230 of the second slave cell S2.

The control device 41 includes three potentiometers $P_M$, $P_{S1}$, and $P_{S2}$ for adjusting the potential difference applied from the power source 62 between the anodes and cathodes respectively of the master cell 10 and the slave cells S1 and S2. Three current meters $A_M$, $A_{S1}$, and $A_{S2}$ measure the currents $I_M$, $I_{S1}$, and $I_{S2}$ flowing respectively through the master cell 10 and the slave cells S1 and S2. A voltage meter $V_M$ measures the potential difference between the cathode 30 of the master cell 10 and the reference electrode 45. A start switch 66 initiates the start of a de-silvering process by completing the connection between the power source 62 and the control device.

A control circuit $C_M$ receives signals from the voltage meter $V_M$ and is linked to the potentiometer $P_M$. Control circuit $C_{S1}$ receives signals from the current meter $A_M$ associated with the master cell 10, and from the current meter $A_{S1}$ associated with the slave cell S1. Control circuit $C_{S2}$ receives signals from the current meters $A_{S1}$ and $A_{S2}$ associated with the slave cells S1 and S2. The control circuits $C_{S1}$ and $C_{S2}$ are linked respectively to the potentiometers $P_{S1}$ and $P_{S2}$ associated with the slave cells S1 and S2.

The apparatus is operated as follows. The contaminated fixing solution is topped up from time to time with fresh fixing solution from a second fixer container 44, while the total liquid volume is maintained at a constant level by means of an overflow 46. Having passed through the master cell 10, the fixing solution passes through the slave cell S1 and then the slave cell S2 before being returned to the first fixer container 42.

The potential difference between the cathode 30 and the reference electrode 45 in the master cell 10 is detected by the voltage meter $V_M$ which sends signals indicative of this potential difference to the control circuit $C_M$. In response thereto, the control circuit $C_M$ adjusts the potentiometer $P_M$ to control the potential applied to the cathode 30 of the master cell 10 according to the preferred potentiostatic control regime, normally to ensure that the potential difference between the cathode 30 of the master cell 10 and the reference electrode 45 remains constant.

The current $I_M$ flowing through the master cell 10 is detected by the current meter $A_M$, which sends a signal indicative thereof to the circuit $C_{S1}$. In response thereto the control circuit $C_{S1}$ adjusts the potentiometer $P_{S1}$ to control the potential $V_{S1}$ fed to the cathode 130 of the first slave cell S1 in accordance with a programme in which the current flow $I_{S1}$, detected by the associated current meter $A_{S1}$ remains equal to the current $I_M$ flowing through the master cell 10, as detected by the current meter $A_M$.

In a similar manner, the current $I_{S1}$ flowing through the first slave cell S1 is detected by the current meter $A_{S1}$, which sends a signal indicative thereof to the circuit $C_{S2}$. In response thereto the control circuit $C_{S2}$ adjusts the potentiometer $P_{S2}$ to control the potential $V_{S2}$ fed to the cathode 230 of the second slave cell S2 in accordance with a programme in which the current flow $I_{S2}$, detected by the associated current meters $A_{S2}$ remains equal to the current $I_{S1}$ flowing through the first slave cell 10, as detected by the current meter $A_{S1}$.

The control device 41 thus behaves as a current copier.

As the de-silvering process progresses, and deposited silver builds up on the cathode 30 of the master cell 10, the conductivity of this cell changes. The control circuit $C_M$ ensures that by way of its control of the potentiometer $P_M$, the potential difference between the cathode 30 and the reference electrode 45 remains constant. The current $I_M$ flowing through the master cell 10 will change however. As this current falls, the control circuits $C_{S1}$ and $C_{S2}$ adjust the potentiometers $P_{S1}$ and $P_{S2}$ to ensure that the currents $I_{S1}$ and $I_{S2}$ through the slave cells S1 and S2 also change, thereby to maintain optimum de-silvering conditions in the slave cells.

Although the apparatus described above makes use of only two slave cells, it is to be understood that an apparatus comprising only one, or more than two, slave cells is also within the scope of the present invention.

Although the use of the apparatus has been described above in connection with a potentiostatic regime in the master cell 10, the apparatus may also be used where the control circuit $C_M$ is programmed according to a different regime, provided that control circuits $C_{S1}$ and $C_{S2}$ act to maintain the current flow through the slave cells equal to that flowing through the master cell.

We claim:

1. An apparatus for de-silvering a silver-containing solution, comprising a plurality of electrolysis cells (10, S1, S2) each having an anode (20, 120, 220) and a cathode (30, 130, 230), characterised in that one of said cells is a master cell (10) further comprising a reference electrode (45) and is associated with means ($A_M$) for detecting the current flow ($I_M$) through said master cell (10), the remaining cell or cells constituting slave cells (S1, S2) which are associated with control means ($C_{S1}$, $C_{S2}$) for adjusting the slave cathode potentials therein in response to the current flow ($I_M$) through said master cell (10).

2. An apparatus according to claim 1, wherein said control means is adapted to ensure that the current flow ($I_{S1}$, $I_{S2}$) through the or each said slave cell (S1, S2) is from 95% to 105% of the current flow ($I_M$) through said master cell (10).

3. An apparatus according to claim 2, wherein said control means are comprised in a current copier (41).

4. An apparatus according to claim 1, wherein the or each said slave cell (S1, S2) does not include a reference electrode.

5. An apparatus according to claim 1, wherein said master cell (10) is arranged in series with the or each said slave cell (S1, S2).

6. An apparatus according to claim 5, wherein all of said cells are arranged in series, with said master cell (10) being the upstream-most cell.

7. An apparatus according to claim 1, wherein said master cell (10) is arranged in parallel with the or each said slave cell (S1, S2).

8. An apparatus according to claim 1, wherein the liquid capacity of the or each said slave cell (S1, S2) is from 95% to 105% of the liquid capacity of said master cell (10).

9. A method of de-silvering a silver-containing solution, comprising passing said solution to a plurality of electrolysis cells (10, S1, S2) each cell having an anode (20, 120, 220) and a cathode (30, 130, 230), characterised in that one of said cells is a master cell (10) further comprising a reference electrode (45), while the remaining cell or cells constitute slave cells (S1, S2), the method including the steps of detecting the current flow ($I_M$) through said master cell (10) and adjusting the cathode potential ($V_{S1}$, $V_{S2}$) in the or each said slave cell (S1, S2) in response thereto.

10. A method according to claim 9, wherein the cathode potential ($V_{S1}$, $V_{S2}$) in the or each said slave cell (S1, S2) is adjusted to ensure that the current flow ($I_{S1}$, $I_{S2}$) through the or each said slave cell (S1, S2) is from 95% to 105% of the current flow ($I_M$) through said master cell (10).

11. A method according to claim 9, wherein said silver-containing solution is fed in series through said master cell (10) and the or each said slave cell (S1, S2).

12. A method according to claim 11, wherein said silver-containing solution is fed first through said master cell (10) and thereafter through the or each said slave cells (S1, S2).

13. A method according to claim 9, wherein said silver-containing solution is fed in parallel through said master cell (10) and the or each said slave cell (S1, S2).

* * * * *